(No Model.)
A. E. FRANCIS.
SPECTACLE FRAME.
No. 505,650. Patented Sept. 26, 1893.
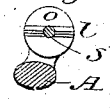
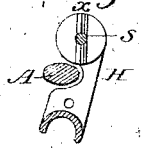
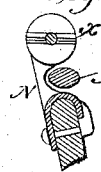
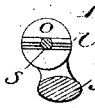
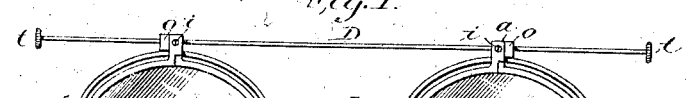
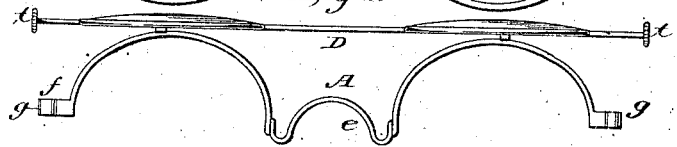
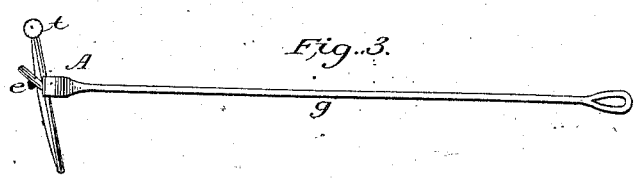
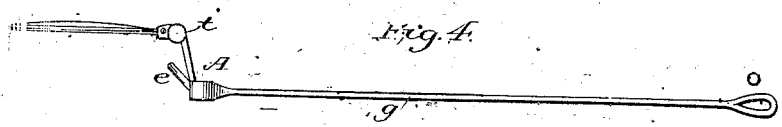
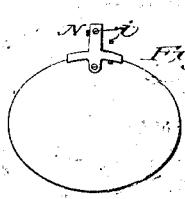
Witnesses:
B. V. Langworthy
Ellmaker W. Stark
Inventor:
Allan E. Francis

UNITED STATES PATENT OFFICE.

ALLAN E. FRANCIS, OF CLEVELAND, OHIO.

SPECTACLE-FRAME.

SPECIFICATION forming part of Letters Patent No. 505,650, dated September 26, 1893.

Application filed October 3, 1892. Serial No. 447,749. (No model.)

*To all whom it may concern:*

Be it known that I, ALLAN E. FRANCIS, a citizen of the United States, residing at Cleveland, in the county of Cuyahoga and State of Ohio, have invented a new and useful Improvement in Spectacle-Frames, of which the following is a specification.

My invention relates to that class of spectacle frames in which it is necessary to accommodate the eyes to the use of lenses at short distances and see objects with natural sight when beyond the range of focus to which the glasses are adapted and in which the lenses are hinged to the frame and raised and lowered at the convenience of the user.

A special object of the improvements is to provide an automatic arrangement whereby such lenses can be securely held in position when either in use, or when elevated above the field of vision. These objects I obtain by the device illustrated in the accompanying drawings of which—

Figure 1 is a front elevation of the frame with lens-holders in position for use. Fig. 2 is the same as Fig. 1 with lens-holders elevated. Fig. 3 is an elevation of one side of frame with lens-holders down. Fig. 4 is same view as Fig. 3 with lens-holders up. Fig. 5 shows a section of frame (enlarged) at $a$ and the inside of hinge lug $o$ upon which is a V shaped projection $l$. Fig. 6 shows section of frame (enlarged) and lens-holder N at same point as Fig. 5 with lens-holder attached having a V shaped slot $x$ for reception of $l$ shown in Fig. 5. Fig. 7 shows corresponding parts to Fig. 6 (enlarged) but in which slot $x$ in holder H is diametrically opposed in the direction of its cut to that in Fig. 6. Fig. 8 shows corresponding parts to Fig. 5 (enlarged). Fig. 9 is a perspective view of lens-frame and holder. Fig. 10 is a perspective view of lens-holder N in which a frame does not surround the glass, it being held in position by a screw passed through same. Fig. 11 shows a lens fastened in lens-holder N.

This device complete consists first of a strong frame A, having saddle $e$, hinge lugs $o$ $o$ and ends $f f$ hinged to bows $g$ $g$. Second lens-holders H or N provided with slots $x$ $x$ binding screws $i$ $i$ and holes $s$ $s$ for rod D. Third rod D with knobs $t$ $t$ for hinging, raising and lowering the lens-holders, H or N being held fast to rod D by set screws $i$ $i$.

It is customary to have frames made to hold lenses in two ways,—either by having frames surround the glass as shown in Fig. 1, giving strength and durability or by having them attached by a screw passed through a hole made in the lens, showing as little metal in construction of holder as possible. It is to make this form of spectacle frame complete for all purposes that holders H and N are shown.

By its irregular form and light construction the frame A is slightly elastic in the direction of its length. This secures a mode of holding the lens-holders in position when up or down. By securing lens-holders H H or N N to rod D bearing against hinge-lugs $o$ $o$ the elasticity of frame A will engage projections $l$ $l$ in slots $x$ $x$. The V shaped projections $l$ $l$ on hinge-lugs $o$ $o$ are cut, for instance, diametrically in the same direction, so that the projections $l$ $l$ are parallel to each other and the slots $x$ $x$ on lens-holders H H are cut in directions diametrically opposed to each other, one being parallel with the projections $l$ $l$ on hinge-lugs $o$ $o$ when the lens-holders H H are down, thus being in position to engage with projection $l$, holding the lenses firmly in position when down: while slot $x$ on the companion holder H is cut at right angles with slot $x$ on its mate, being thus diametrically opposed to projection $l$ on its fellow hinge-lug $o$ and in position to engage with same when the lens-holders are elevated by a quarter turn, of rod D. By this arrangement of the slots $x$ $x$ and projections $l$ $l$, a slot and projection are engaged at the hinge of one lens-holder when holding the same down and at the hinge of the other lens-holder when holding them in an elevated position, both lens-holders being fastened on rod D in position to hold lenses on same plane.

The positions of slots $x$ $x$ and projections $l$ $l$ on the lens-holders H H and on hinge-lugs $o$ $o$ are immaterial except in maintaining their relative positions. They may be reversed or modified or cut at any angle so long as they engage to hold the lenses in the required position.

Lens frame H has the usual mode of clasping the lens by means of a binding screw $v$.

It is intended that in use the frame is to be constantly left in one position. When the lenses are up the spectacles are no obstruction to vision. A quarter turn of rod D brings the lenses, if up, into exact position for use. A reversed quarter turn throws them back again when they are held free from contact with anything and where they are not dimmed by perspiration or soiled by touch.

In this improvement the parts which are new consist exclusively, first of the single ungrooved parts of frame A connecting saddle $e$ with hinged bows $g$ $g$, these portions being mounted with hinge lugs $o$ $o$; second, the upper ends of lens-holders H and N having holes $s$ $s$ for reception of rod D and binding screws $i$ $i$; third, rod D connecting and hinging the lens-holders to the frame, used also for the purpose of raising and lowering the lenses as described. All other portions shown are old and, as is well known, are found in any pair of common spectacles.

Having thus described my invention, what I claim is—

The combination of the elastic frame A, provided with hinge lugs $o$ $o$ having projections $l$ $l$, with the lens-holders H, H, having slots $x$, $x$, all arranged substantially as described.

ALLAN E. FRANCIS.

Witnesses:
BELLE C. LANGWORTHY,
ELLMAKER W. STARK.